(12) United States Patent
Breuer et al.

(10) Patent No.: US 8,160,040 B2
(45) Date of Patent: Apr. 17, 2012

(54) SCHEDULING OF MEASUREMENT OCCASIONS OF A MOBILE TERMINAL

(75) Inventors: Volker Breuer, Bötzow (DE); Thomas Malcolm Chapman, Southampton (GB); Thomas Ulrich, Bad Dürkheim (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 12/312,228

(22) PCT Filed: Oct. 30, 2007

(86) PCT No.: PCT/GB2007/050660
§ 371 (c)(1),
(2), (4) Date: Dec. 23, 2009

(87) PCT Pub. No.: WO2008/053245
PCT Pub. Date: May 8, 2008

(65) Prior Publication Data
US 2010/0118713 A1  May 13, 2010

(30) Foreign Application Priority Data

Oct. 31, 2006 (GB) .................................. 0621598.2
Oct. 25, 2007 (GB) .................................. 0720885.3

(51) Int. Cl.
*H04W 4/00* (2009.01)
(52) U.S. Cl. .................. 370/338; 370/252; 455/450
(58) Field of Classification Search .................. 370/252, 370/321, 328, 329, 332, 337, 338, 341, 347; 455/343.2–343.4, 450
See application file for complete search history.

(56) References Cited

U.S. PATENT DOCUMENTS

| | | | | |
|---|---|---|---|---|
| 6,901,065 | B1* | 5/2005 | Ehrstedt et al. | 370/341 |
| 7,099,346 | B1 | 8/2006 | Kanterakis | |
| 2005/0079865 | A1* | 4/2005 | Ahn et al. | 455/434 |
| 2006/0146745 | A1* | 7/2006 | Cai et al. | 370/328 |

FOREIGN PATENT DOCUMENTS

| | | |
|---|---|---|
| DE | 10 2004 039 155 | 2/2006 |
| EP | 1 081 979 | 3/2001 |
| WO | 2005/048529 | 5/2005 |
| WO | 2005/109939 | 11/2005 |
| WO | 2006/018368 | 2/2006 |
| WO | 2006/114692 | 11/2006 |

OTHER PUBLICATIONS

3GPP TS 25.331 version 7.0.0 Release 7, Universal Mobile Telecommunications System (UMTS); Radio Resource Control (RRC) protocol specification, Mar. 2006.
Siemens, Measurement Occasion Handling in HSDPA enhanced CELL_FACH, 3GPP TSG-RAN WG2 #56BIS, R2-070138, Jan. 15, 2007, pp. 1-2.
Huawei, Discussion on measurement control on CELL_FACH, 3GPP TSG-RAN WG2 #56bis, R2-070154, Jan. 15, 2007, pp. 1-2.
Nokia, Analysis of HSDPA in CELL_FACH state, 3GPP TSG-RAN WG1 #46BIS, R1-062884, Oct. 9, 2006, pp. 1-5.

* cited by examiner

*Primary Examiner* — Ricky Ngo
*Assistant Examiner* — Kan Yuen
(74) *Attorney, Agent, or Firm* — Staas & Halsey LLP

(57) ABSTRACT

In a method of downlink operation in a communication system having a network controller, a base station and a terminal, one communication channel is scheduled by the base station; and one communication channel is scheduled by the network controller. The terminal listens to the channel scheduled by the base station at predetermined times known to the terminal and the network controller. Information is signalled from the network controller to the base station, relating to the predetermined times.

16 Claims, 2 Drawing Sheets

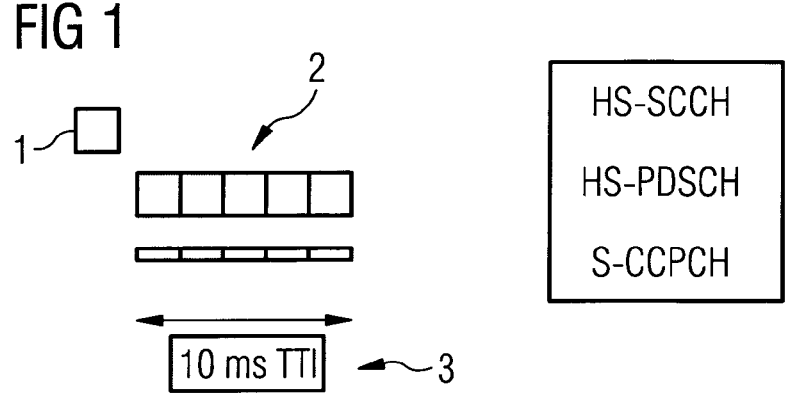
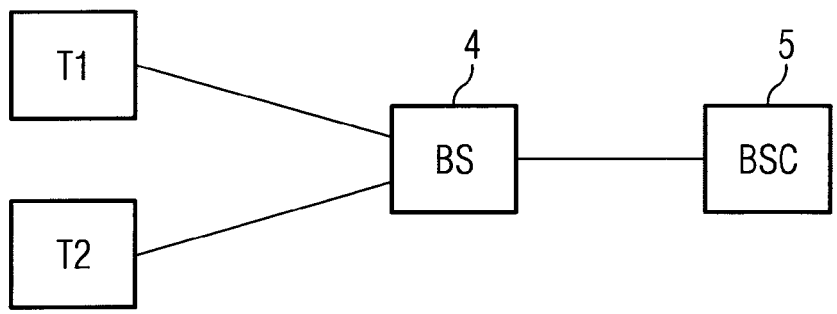
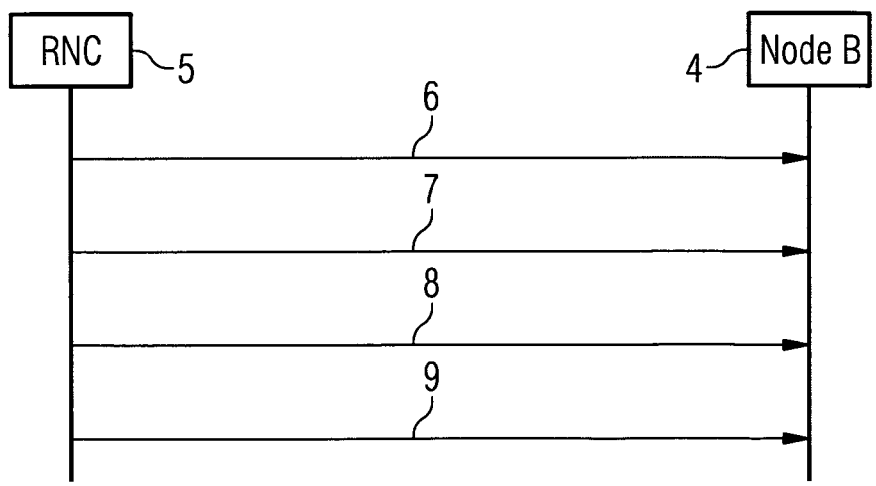

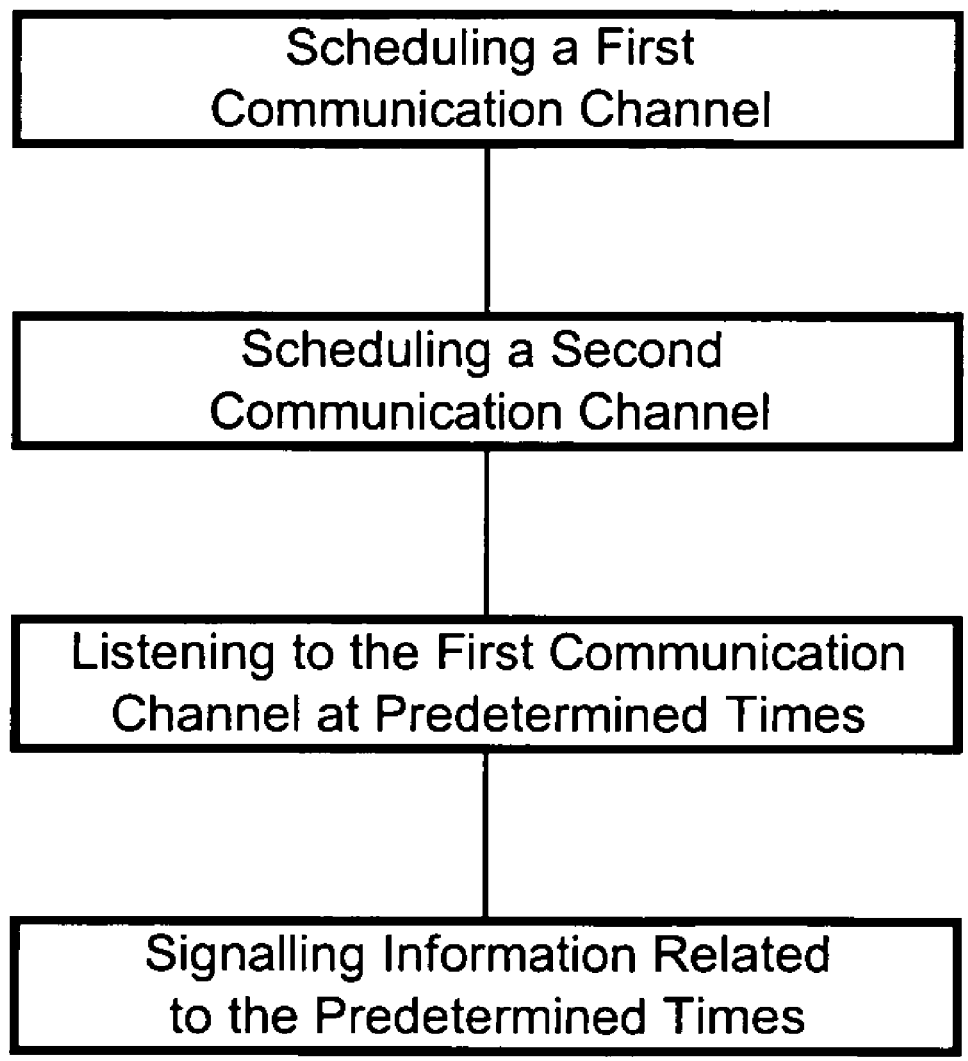

SCHEDULING OF MEASUREMENT OCCASIONS OF A MOBILE TERMINAL

CROSS REFERENCE TO RELATED APPLICATIONS

This application is based on and hereby claims priority to PCT Application No. PCT/GB2007/050660 filed on Oct. 30, 2007, GB Application No. 0621598.2 filed on Oct. 31, 2006 and GB Application No. 0720885.3 filed on Oct. 25, 2007, the contents of which are hereby incorporated by reference.

BACKGROUND

This invention relates to a method of downlink operation in a communication system.

In Release 6 universal mobile telecommunications system (UMTS) terrestrial radio access network (UTRAN) frequency division duplex (FDD) systems a terminal can be in one of two states in the downlink, cell forward access channel (Cell_FACH) or cell dedicated channel (Cell_DCH). In Cell_FACH, there is no active connection to the Node B at the physical layer, no regular power control, or uplink. In Cell_DCH, there is continuous power control and active uplink and downlink. However, it is not desirable to keep the terminal in Cell_DCH state, as this uses up resources, so it is usual to move the terminal to another state when not actually communicating. Although it is not generally efficient to do so, the Cell_FACH state can be used for transmissions of small amounts of data. There are discussions to increase throughput and reduce latency requirements for users in Cell_FACH state by enabling the NodeB to map the data of the forward access channel (FACH) on high speed physical downlink shared channel (HS-PDSCH).

One proposal under discussion in $3^{rd}$ generation partnership project (3GPP) is that the high speed downlink shared channel (HS-DSCH) be used for carrying the FACH for users in CELL_FACH state, rather than using the secondary common control physical channel (S-CCPCH). This proposal is based on the assumption that the HS-DSCH would be transmitted on several consecutive occasions to the terminal, or user equipment (UE) to overcome the problems of feedback free operation and ensure correct reception at the same time. The high speed shared control channel (HS-SCCH) is required to indicate the start of the HS-DSCH transmission. Although consecutive transmission has advantages concerning latency, overcoming the problems due to different knowledge states in different involved entities, when comparing high speed downlink packet access (HSPDA) transmission versus S-CCPCH transmission as currently used as a physical channel for carrying the FACH, is not considered here.

Conventionally, the S-CCPCH, under control of the radio network controller (RNC) and the NodeB, the NodeB being used as transmitter only, has been used to carry the FACH and so the mobility procedures were controlled by the RNC. To enable inter-frequency and inter-radio access technology (RAT) measurements, FACH measurement occasions were assigned to different UEs, depending on a modulo cell radio network temporary identifier (C-RNTI) operation. In Cell-FACH state, a UE is requested to listen continuously whether it is scheduled, or not. For inter-frequency or inter-RAT measurements the UE needs to listen to other frequencies, so the FACH measurement occasions were introduced. The other measurements for handover are done based on the UE's internal identifier and when the RNC recognises this, the UE is switched to another frequency to do its measurements. However, the Node B has no knowledge of the measurement occasions as the Node B schedules as directed by the RNC. If the Node B is scheduling on HS-DSCH without knowing the measurement occasions, the Node B may try scheduling when the UE is on another frequency. This can give rise to loss of repeat transmissions due to the length of time that the UE is off the scheduling frequency.

SUMMARY

The inventors propose a method of downlink operation in a communication system comprising a network controller, a base station and a terminal. According to the method, one communication channel is scheduled by the base station; and one communication channel is scheduled by the network controller; wherein the terminal listens to the channel scheduled by the base station at predetermined times known to the terminal and the network controller; further comprises signalling from the network controller to the base station, information relating to the predetermined times.

Preferably, the communication system is in a state where there is no active communication between the terminal and the base station.

Preferably, the channel scheduled by the network controller has a longer transmit time interval than the channel scheduled by the base station.

Preferably, the downlink is high speed downlink packet access (HSDPA).

Preferably, the state is cell forward access channel (Cell_FACH) state.

Preferably, the network controller is a radio network controller.

Preferably, the base station is a Node B.

Preferably, the predetermined times are measurement occasions of the terminal.

Preferably, FACH content is mapped onto a high speed physical downlink shared channel (HS-PDSCH), or onto a high speed downlink shared channel (HS-DSCH).

Preferably, the signalling includes information on a relationship of secondary common control physical channel (S-CCPCH) transmit time interval (TTI) length and measurement occasion.

Preferably, the terminal has two operating states, one of which includes occasions at which the terminal retunes; and wherein the timing of the occasions is signalled from the network controller to the base station.

Preferably, the S-CCPCH having the smallest TTI length provided by the network is a reference for calculating length of a measurement occasion.

Preferably, the S-CCPCH using the left most or right most code of an orthogonal variable spreading factor (OVSF) code tree is a reference for calculating length of a measurement occasion.

Preferably, the signalling includes the cell radio network temporary identifier.

Preferably, without further signalling, a quick repeat transmission is resumed with its existing setting directly after termination of a measurement occasion, if an original repeat transmission was interrupted by the measurement occasion.

Preferably, the terminal can choose not to receive the resumed transmission, if the interrupted original repeat transmission was sufficient.

The inventors also propose a communication system operating in downlink. The communication system includes a base station, a base station controller and at least one terminal; wherein the terminal has two operating states in downlink; wherein in one operating state the terminal retunes its receiver to take measurements; and wherein times at which the retuning takes place are signalled from the base station controller to the base station.

Preferably, the base station controller further comprises a store to store rules which have been defined to determine timing of a next retransmission after a collision between a retuning to take measurements and a retransmission.

Preferably, the base station controller further comprises a processor, for processing an identifier of the terminal and determining timing of the retuning to take measurements from the identifier.

Preferably, the system operates high speed downlink packet access in Cell_FACH state.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 illustrates signalling in different channels;

FIG. 2 is a block diagram of an example of a typical system for implementing the proposed method;

FIG. 3 illustrates message exchange in the system of FIG. 2; and

FIG. 4 illustrates a method of downlink operation in a communication system having a network controller, a base station and a terminal.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The inventors' proposals address the problem of the base station trying to schedule the terminal during measurement occasions by providing information to the base station about the measurement occasions.

Technical specification TS25.331 defines the measurement occasion as follows:

When in CELL_FACH state and when the variable C_RNTI is non-empty the UE in FDD mode shall perform measurements as specified in subclauses 8.4.1.6 and 8.4.1.9 during the frame(s) with the cell system frame number (SFN) value fulfilling the following equation:

$$SFN \text{ div } N = C\_RNTI \mod M\_REP + n*M\_REP$$

where

N is the transmission time interval (TTI), in number of 10 ms frames, of the FACH having the largest TTI on the S-CCPCH selected by the UE according to the procedure in subclause 8.5.19. FACHs that only carry multimedia broadcast multicast service (MBMS) logical channels (MBMS traffic channel (MTCH), MBMS point to multipoint scheduling channel (MSCH), or MBMS point to multipoint control channel (MCCH)) are excluded from measurement occasion calculations.

C_RNTI is the C-RNTI value of the UE stored in the variable C_RNTI

M_REP is the Measurement Occasion cycle length. According to the equation above, a FACH Measurement Occasion of N frames will be repeated every N*M_REP frame, and $M\_REP=2^k$.

where, k is the FACH Measurement occasion cycle length coefficient.

The value of the FACH Measurement occasion cycle length coefficient is read in system information in "System Information Block type 11" or "System Information Block type 12" in the information element (IE) "FACH measurement occasion info".

n=0, 1, 2 . . . as long as the SFN is below its maximum value

The UE is allowed to measure on other occasions in case the UE moves "out of service" area, or in case it can simultaneously perform the ordered measurements.

This means that the UE measurement behaviour depends on the TTI length of the used S-CCPCH to carry the FACH and is multiplied by 2^K which describes the measurement occasion cycle length. Which of these 2^K TTIs the Ue performs its measurements in, depends on the modulo C-RNTI operation. By these functions it is ensured that in case of a sufficient number of UEs within Cell-FACH, the times when UEs perform their measurements are nearly evenly distributed and there are always sufficient UEs to listen to the S-CCPCH. However, knowledge of the C-RNTI and the measurement occasions itself is present in the RNC and in the UE. Up to now, the NodeB has no knowledge of the measurement occasions as it schedules the UE as indicated by the RNC and so no knowledge is needed.

FIG. 1 illustrates a comparison of FACH scheduling via S-CCPCH against FACH scheduling via HS-DSCH, including HS-SCCH indication. A first signalling block 1 is sent on the HS-SCCH, then moves to the HS-PDSCH and is repeated 2 several times. Considering the offset between HS-SCCH and HS-DSCH it is clear that a 5 times quick repeat would not even work within a 10 ms S-CCPCH TTI 3, which is the most commonly used TTI for S-CCPCH, even if a schedule "now" command for HSDPA were used. The UE may miss either the scheduling information, or the last transmissions, as the NodeB is not aware of the periods the UE is listening, nor would any scheduling method introducing more diversity than consecutive scheduling work.

To overcome the above mentioned problems it is important that the NodeB has awareness of the measurement behaviour of the UE. As a consequence, corresponding signalling from the RNC to the NodeB needs to be introduced as the NodeB has no UE context and in Cell-FACH there is no such context at all. However, by providing the C-RNTI and the calculation rule for the measuring occasions, the NodeB is able to calculate the times when the UE is listening and when the UE is measuring autonomously. In addition, if the FACH content is mapped to the HS-PDSCH only, then there needs to be clarification of which S-CCPCH TTI length drives the measurement occasion length used in the FACH calculation. Although, an S-CCPCH exists carrying FACH data for non-HSDPA UEs, the NodeB is not aware of this and there may also be multiple S-CCPCHs with different TTI length. For example, MTCH is also mapped to the S-CCPCH having a very large TTI. As a consequence an additional rule can be introduced as the reference for the FACH measurement occasions for UEs of which data are mapped into the HS-DSCH in general. For example, if the FACH is mapped onto HS-DSCH, the S-CCPCH with the smallest TTI length provided by the network is used as a reference for calculating the length of the measurement occasion; or the S-CCPCH using the most left or right code of the OVSF code tree. Such additional definition for the measurement occasions is required as the S-CCPCH carrying the FACH as used in the definition may be meaningless for some of the UEs.

Furthermore, the C-RNTI of a UE which receives the FACH via HS-PDSCH needs to be known in the NodeB, or the measurement occasion group, to which it belongs. The corresponding signalling needs to be introduced in the RNC to NodeB signalling and is made use of by the NodeB to MAC-HS. This ensures that during a measurement occasion a UE need not be scheduled or notified because the NodeB takes the measurement occasions into account.

Furthermore, consideration is required of the fact that the quick repeat scheduling via HS-DSCH may be interrupted by a measurement occasion, as the measurement occasions generally have priority over data reception. This applies particularly if, for the introduction of additional diversity, non contiguous quick repeat/interleaved FACH mapped on HS-PDSCH scheduling patterns, were defined. Thus, if a quick repeat transmission is interrupted by a measurement occasion it shall be resumed directly after terminating the measurement occasion with the same settings applied to the HS-PDSCH prior the measurement occasion, without any additional HS-SCCH signalling. If the UE evaluates that the reception was already successful, based on that portion of the quick-repeat transmission received prior the measurement occasion, then the UE is not required to receive the remaining part after the measurement occasion and can extend it accordingly until a new HS-SCCH indication arrives.

FIG. 2 illustrates a typical system in which the proposed method is applied. Terminals, or UEs T1, T2 communicate with a network via a base station, or Node B 4 and a base station controller, or radio network controller RNC 5. The RNC sends configuration information and measurement information to the Node B. As shown in the example of FIG. 3, the RNC 5 sends HS-DSCH configuration 6, FACH configuration 7, reference TTI and N for measurements 8 and UE specific measurement information 9, such as C-RNTI.

FIG. 3 illustrates a method of downlink operation in a communication system having a network controller, a base station and a terminal. The method includes scheduling a first communication channel by the base station, scheduling a second communication channel by the network controller, listening to the first communication channel at the terminal at predetermined times known to the terminal and the network controller, and signalling, from the network controller to the base station, information relating to the predetermined times. The information further relates to measurement occasions of the terminal.

The proposals allow for HSDPA to be used in CELL_FACH state without clashing with measurement occasions, which would otherwise not be possible. A system comprising a basestation, a basestation controller and terminals with two operating states, in one of the operating states the times at which the terminal retunes its receiver are unknown to the basestation, which is controlling the allocation of radio resources, and thus the basestation controller informs the basestation of these occasions. A rule can be applied in the event of a collision of a retransmission and a measurement as to the occurrence of the next retransmission. The measurement occasion may be calculated from the identity of the terminal.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method of downlink operation in a communication system having a network controller, a base station and a terminal, the method comprising:

scheduling a first communication channel by the base station for communication with the base station;

scheduling a second communication channel by the network controller for communication with the network controller;

monitoring the first communication channel at the terminal at predetermined times known to the terminal and the network controller; and signaling, from the network controller to the base station using the second communication channel, information relating to the predetermined times so that the base station has awareness of the terminal, said information further relating to measurement occasions of the terminal.

2. A method according to claim 1, wherein the communication system is in a state where there is no active communication between the terminal and the base station.

3. A method according to claim 1, wherein the second communication channel scheduled by the network controller has a longer transmit time interval than the first communication channel scheduled by the base station.

4. A method according to claim 1, wherein the downlink is a universal mobile telecommunications system (UMTS) terrestrial radio access (UTRA) frequency division duplex (FDD) high speed downlink packet access (HSDPA) transmission.

5. A method according to claim 1, wherein the terminal is in a cell forward access channel (Cell_FACH) state.

6. A method according to claim 5, wherein forward access channel (FACH) content is mapped onto a high speed physical downlink shared channel (HS-PDSCH), or onto a high speed downlink shared channel (HS-DSCH).

7. A method according to claim 1, wherein the network controller is a radio network controller.

8. A method according to claim 1, wherein the base station is a Node B.

9. A method according to claim 1, wherein the predetermined times are measurement occasions for the terminal.

10. A method according to claim 9, wherein, if a repeat transmission with an existing setting was interrupted by the measurement occasion, the measurement occasion is resumed without further signaling and with the existing setting directly after termination of the measurement occasion.

11. A method according to claim 10, wherein the terminal decides whether to receive the repeat transmission after interruption based on whether the repeat transmission before interruption was sufficient.

12. A method according to claim 1, wherein the signaling includes information on a relationship of secondary common control physical channel (S-CCPCH) transmit time interval (TTI) length and measurement occasions.

13. A method according to claim 12, wherein a plurality of S-CCPCHs are provided by network controller, and the S-CCPCH having the smallest transmit time interval (TTI) length is used as a reference for calculating a length of the measurement occasions.

14. A method according to claim 12, wherein the S-CCPCH using a left most or right most code of an orthogonal variable spreading factor (OVSF) code tree is used as a reference for calculating a length of the measurement occasions.

15. A method according to claim 1, wherein the terminal has two operating states, one of which includes occasions at which the terminal retunes, the occasions occur periodically according to a timing, and the timing of the occasions is signaled from the network controller to the base station.

16. A method according to claim 1, wherein the signaling includes a cell radio network temporary identifier.

* * * * *